United States Patent
Rao et al.

(10) Patent No.: US 12,131,105 B2
(45) Date of Patent: Oct. 29, 2024

(54) VIRTUAL MEASUREMENT OF CONDITIONS PROXIMATE TO A SUBSTRATE WITH PHYSICS-INFORMED COMPRESSED SENSING

(71) Applicant: Applied Materials, Inc., Santa Clara, CA (US)

(72) Inventors: Preetham Prahallada Rao, Morgan Hill, CA (US); Prashanth Kothnur, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 634 days.

(21) Appl. No.: 17/476,408

(22) Filed: Sep. 15, 2021

(65) Prior Publication Data
US 2023/0078146 A1 Mar. 16, 2023

(51) Int. Cl.
| | |
|---|---|
| *G06F 30/27* | (2020.01) |
| *G06F 18/214* | (2023.01) |
| *G06N 20/20* | (2019.01) |
| *H01L 21/67* | (2006.01) |
| *G06F 111/06* | (2020.01) |

(52) U.S. Cl.
CPC ............ *G06F 30/27* (2020.01); *G06F 18/214* (2023.01); *G06N 20/20* (2019.01); *H01L 21/67011* (2013.01); *H01L 21/67248* (2013.01); *G06F 2111/06* (2020.01)

(58) Field of Classification Search
CPC .... G06F 30/27; G06F 18/214; G06F 2111/06; G06N 20/20; H01L 21/67011; H01L 21/67248
See application file for complete search history.

(56) References Cited

U.S. PATENT DOCUMENTS

| | | | |
|---|---|---|---|
| 8,572,155 B2 | 10/2013 | Yanovich et al. | |
| 2020/0333774 A1 | 10/2020 | Banna | |
| 2021/0193444 A1 | 6/2021 | Meng | |
| 2022/0350254 A1* | 11/2022 | Pisarenco | ........... G03F 7/70683 |
| 2023/0066516 A1* | 3/2023 | Torres Robles | . G05B 19/41885 |

FOREIGN PATENT DOCUMENTS

| | | | | |
|---|---|---|---|---|
| CN | 109816634 A | | 5/2019 | |
| WO | WO 2021/154747 A1 * | | 1/2021 | .............. H01J 21/66 |

OTHER PUBLICATIONS

Wan J, McLoone S. Gaussian process regression for virtual metrology-enabled run-to-run control in semiconductor manufacturing. IEEE Transactions on Semiconductor Manufacturing. Oct. 30, 2017;31(1):12-21. (Year: 2017).*

(Continued)

*Primary Examiner* — Chuen-Meei Gan
(74) *Attorney, Agent, or Firm* — Lowenstein Sandler LLP

(57) ABSTRACT

A method includes measuring a subset of property values within a manufacturing chamber during a process performed on a substrate within the manufacturing chamber. The method further includes determining property values in the manufacturing chamber at locations removed from the locations the measurements are taken. The method further includes performing a corrective action based on the determined properties.

17 Claims, 6 Drawing Sheets

(56) References Cited

OTHER PUBLICATIONS

Thanh, T. B. et al. "Aerodynamic Data Reconstruction and Inverse Design Using Proper Orthogonal Decomposition" AIAA Journal, Aug. 2004, pp. 1505-1516, vol. 42, No. 8.
Bai, Z. et al. "Dynamic mode decomposition for compressive system identification", AIAA Journal, Febraury 2020, pp. 561-574, vol. 58, No. 2.
Lu, Y. et al. "Monitoring temperature in additive manufacturing with physics-based compressive sensing" Journal of Manufacturing Systems, Jul. 2018, pp. 60-70, vol. 48, Part C.
Willard, J. et al. "Integrating Physics-Based Modeling With Machine Learning: A Survey" arXiv:2003.04919v4; Jul. 2020, 34 pages, vol. 1, No. 1; Association for Computing Machinery.
Manohar, K. et al. "Data-Driven Sparse Sensor Placement for Reconstruction" arXiv:1701.07569, Jan. 2017, 34 pages; IEEE Control Syst. Mag. 38 (2018).
International Search Report and Written Opinion of International application No. PCT/US2022/043531 dated Jan. 10, 2023; 10 pages.

\* cited by examiner

VIRTUAL MEASUREMENT OF CONDITIONS PROXIMATE TO A SUBSTRATE WITH PHYSICS-INFORMED COMPRESSED SENSING

TECHNICAL FIELD

The instant specification relates to using a physics-informed compressed sensing machine learning model to virtually measure properties proximate to a substrate in a manufacturing chamber.

BACKGROUND

Chambers are used in many types of processing systems. Examples of chambers include etch chambers, deposition chambers, anneal chambers, and the like. Typically, a substrate, such as a semiconductor wafer, is placed in a chamber and conditions in the chamber are set and maintained to process the substrate. To fully characterize and predict the effects of processing conditions, measurements of property values at the location of the substrate would be ideal. It is often inconvenient or impossible to perform measurements at the location of the substrate. Many systems have more convenient, albeit less immediately useful, places to measure the values of relevant operational properties, such as temperature, gas flow, pressure, etc.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the disclosure, a method includes measuring values of some property or properties at a number of locations within a manufacturing chamber. The measurements are taken during a process performed on a substrate by sensors placed in the chamber. The method further includes providing the measured property values as input to a trained machine learning model. The trained machine learning model is capable of using the measurements at the locations at which the sensors are placed to infer property values elsewhere in the chamber, including the location of the substrate. The method further includes performing an action in view of the properties inferred by the trained machine learning model.

In another aspect of the disclosure, a method includes training a machine learning model. The method further includes providing training input data to the machine learning model. The training input data includes measurements of property values taken at locations within a manufacturing chamber while a substrate is being processed. At least a majority of the measurements are taken at locations not immediately adjacent to the substrate. The method further includes providing target output data to the machine learning model. The target output includes a map of property values in regions of the chamber, including the location of the substrate. The method further includes providing sets of input and output data to the machine learning model, in order to train the model to predict a map of property values in regions of the chamber given measurements from a number of locations in the chamber.

In another aspect of the disclosure, a system for implementing methods such as those discussed above is disclosed. The system includes a computer-readable storage medium. The system further includes a processing device. The system is configured such that the computer-readable storage medium contains instructions that, when executed, cause the processing device to perform a method. The method performed by the processing device includes receiving measurements of property values during a manufacturing process in a manufacturing chamber from sensors placed within the manufacturing chamber. The method performed by the processing device further includes using a trained machine learning model to determine property values in a region of the manufacturing chamber, including the location of the substrate. The method performed by the processing device further includes performing a corrective action or sending an alert to a user device in view of the determined property values.

BRIEF DESCRIPTION OF THE DRAWINGS

The present disclosure is illustrated by way of example, and not by way of limitation in the figures of the accompanying drawings.

DETAILED DESCRIPTION

Figure 1:
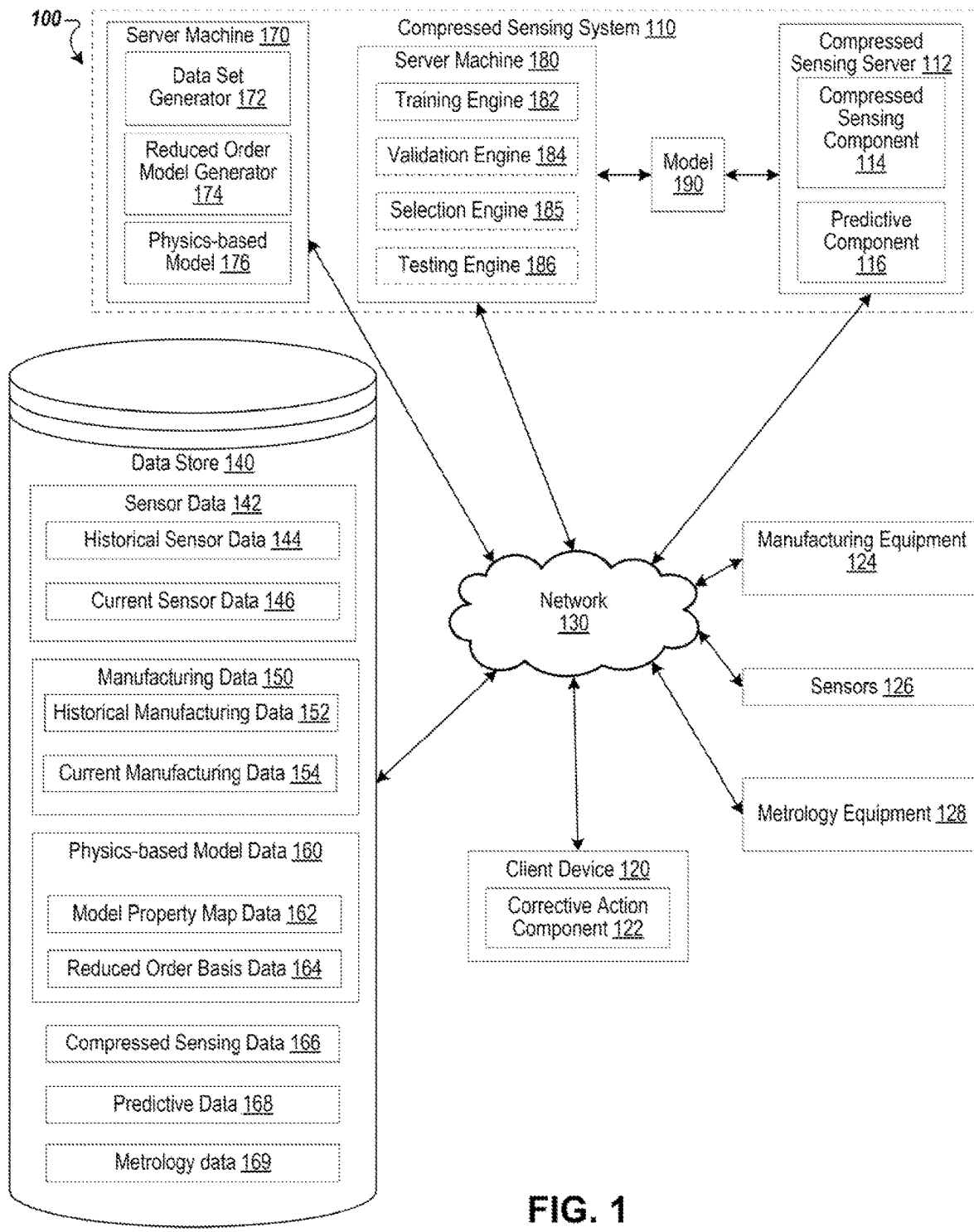
FIG. 1 is a block diagram illustrating an exemplary system (exemplary system architecture), according to certain embodiments.

Described herein are technologies directed to virtual measurement of property values at the location of a substrate inside a manufacturing chamber using physics-informed compressed sensing techniques. Manufacturing equipment is used to produce substrates, such as semiconductor wafers. The properties of these substrates are controlled by the conditions under which the substrates were processed. Accurate knowledge of the properties in the manufacturing chamber during operation, especially in the immediate vicinity of the substrate, can be used to predict the properties of finished products, consistently produce substrates with the same properties, and tailor processing parameters to account for variations in chamber design and build.

In some cases, sensors can be disposed at the location of the substrate, or sensors may be used that are capable of making measurements from a distance (e.g., IR temperature sensors). In some cases, such arrangements are impractical or impossible. In cases where direct measurement of property values proximate to a substrate (e.g., on the substrate) is undesirable, empirical methods can be used to produce consistent substrates with chosen properties. Such an approach involves experimentation, which can be costly in terms of time expended, material used, energy and gasses expended, etc. Additionally, as manufacturing chambers are used repeatedly, their properties tend to drift, due to material buildup, aging parts, alterations during cleaning procedures, and the like. Any acquired knowledge mapping input processing parameters to output substrate properties degrades as chamber properties drift. A further problem with this conventional approach is related to differences between chambers. Any new chamber design uses a new set of experiments to determine a new mapping of input parameters to finished product properties, which mappings will also degrade in quality as the chamber ages. Additionally, manufacturing chambers are subject to tolerance ranges when they are built, meaning each chamber has the potential to work somewhat differently, even differently than a chamber it is nominally identical to. Not only for each chamber type are experiments performed to obtain an accurate understanding of what input parameters lead to what products, but each individual chamber may be subject to this treatment, and the understanding of these properties may benefit from constant updating. Any attempt to produce a different type of substrate, with properties outside the bounds of previously gathered knowledge about chamber operations, further compounds the problem.

The methods and devices of the current disclosure address at least some of these deficiencies of the conventional approach. This disclosure enables the use of virtual measurement of properties at the substrate, utilizing physics-informed compressed sensing. In some embodiments, the methods of the present disclosure include the use of a computer-aided physics-based model. The physics-based model is configured to contain all the features of a manufacturing chamber of interest, including geometry, material properties, gas flow, etc. The physics-based model is then run multiple times, possibly reflecting a range of processing parameters. For instance, the power supplied to heaters, the gas mix used, the flow rate and pressure of the gas, hardware parameters such as the placement of the substrate, and the like can all be varied. The output of these computations using the physics-based model is a set of maps indicative of property values at steady state within the manufacturing chamber. The set of maps may span a significant portion of parameter space relevant to substrate production.

In some embodiments, the methods of the present disclosure further include using the output of the physics-based model to construct a basis set to describe possible combinations of property values in the manufacturing chamber. The conceptually simplest representation of properties in a chamber is typically assigning a value for each property to each point in the chamber. This can be considered to be a weighted combination of basis set members, where each member of the basis set comprises some value of a property (e.g., a temperature of 1 Kelvin) at one particular point in the chamber, with every other point in the chamber assigned a null value in the property (e.g., zero Kelvin). The entire property value map of the chamber is then built up by adding weighted combinations of each basis state to assign a non-zero temperature to every point in the chamber.

This conceptually simple representation is often not the most convenient. Instead, basis sets with more complicated members may be used, where the properties in the chamber are expressed as a weighted additive combination of basis state members. If the basis set is chosen carefully, far fewer members may be used to adequately describe the property values in the chamber than are used in the simple case, where every member of the basis set contributes meaningfully. The methods of the current disclosure include, in some embodiments, constructing a basis set from the output of the physics-based model such that weighted additive combinations of fewer basis states (than in the simple representation) are used to adequately describe property values in the chamber in the region of parameter space relevant to substrate production. This basis set with reduced dimensionality is referred to as a Reduced Order Model (ROM). The ROM in some embodiments may be formed by performing proper orthogonal decomposition on the output of the physics-based model.

The methods of this disclosure further include, in some embodiments, training a machine learning model to take as input a limited subset of property values, corresponding to property values at a number of locations within the manufacturing chamber. The machine learning model is trained to produce as output a map of property values extending to locations beyond those used as input, including property values proximate to the substrate. In some embodiments, the machine learning model is trained using a sparse regression model. Alternatively, other types of machine learning models may be used, such as neural networks, support vector machines, and so on.

The methods of this disclosure further include, in some embodiments, providing as input to a trained machine learning model measurements of a subset of property values within a manufacturing chamber during processing. The method further includes receiving as output from the trained machine learning model predictions of properties proximate to the substrate. This disclosure also enables the use of a system, including a processing device and memory, for performing methods of physics-informed compressive sensing and virtual measurement.

Aspects of the present disclosure result in technological advantages over conventional methods. Predictions of property values proximate to a substrate (e.g., values such as temperature at points on the substrate) during processing can be inferred accurately without making concessions to the quality of processing by arranging for measurement devices to be disposed proximate to the substrate. Additionally, by using a basis set informed by a physics-based model of the chamber to inform temperature mapping, variations from chamber to chamber, or in one chamber over time, can be accounted for using the disclosed methods.

FIG. 1 is a block diagram illustrating an exemplary system 100 (exemplary system architecture), according to certain embodiments. The system 100 includes a client device 120, manufacturing equipment 124, sensors 126, metrology equipment 128, a compressed sensing server 112, and a data store 140. The compressed sensing server 112 may be part of a compressed sensing system 110. The compressed sensing system 110 may further include server machines 170 and 180.

The sensors 126 may provide sensor data 142 associated with manufacturing equipment 124 (e.g., associated with producing, by manufacturing equipment 124, corresponding products, such as wafers). The sensor data 142 may be used for equipment health and/or product health (e.g., product quality), for example. The manufacturing equipment 124 may produce products following a recipe or performing runs over a period of time. In some embodiments, the sensor data 142 may include values of one or more of temperature (e.g., heater temperature), spacing (SP), pressure, High Frequency Radio Frequency (HFRF), voltage of Electrostatic Chuck (ESC), electrical current, flow (e.g., of one or more gases), power, voltage, etc. Sensor data 142 may include historical sensor data 144 and current sensor data 146. Manufacturing equipment 124 may be configured according to manufacturing data 150. Manufacturing data 150 may be associated with or indicative of manufacturing parameters such as hardware parameters (e.g., settings or components (e.g., size, type, etc.) of the manufacturing equipment 124) and/or process parameters of the manufacturing equipment. Manufacturing data 150 may include historical manufacturing data 152 and/or current manufacturing data 154. Manufacturing data 150 may be indicative of input settings to the manufacturing device (e.g., heater power, gas flow, etc.). Sensor data 142 and/or manufacturing data 150 may be provided while the manufacturing equipment 124 is performing manufacturing processes (e.g., equipment readings when processing products). The sensor data 142 may be different for each product (e.g., each wafer).

In some embodiments, the sensor data 142, metrology data 169, and/or manufacturing data 150 may be processed (e.g., by the client device 120 and/or by the compressed sensing server 112). Processing of the sensor data 142 may include generating features. In some embodiments, the features are a pattern in the sensor data 142, metrology data 169, and/or manufacturing data 150 (e.g., slope, width, height, peak, etc.) or a combination of values from the sensor data 142, metrology data 196, and/or manufacturing data 150 (e.g., power derived from voltage and current, etc.). The sensor data 142 may include features and the features may be used by the compressed sensing component 114 for performing signal processing and/or for obtaining predictive data 168 and/or compressed sensing data 166, possibly for performance of a corrective action. Compressed sensing data 166 may be any data associated with compressed sensing system 110, e.g. predicted sensor data at the location of a substrate during a manufacturing process.

Each instance (e.g., set) of sensor data 142 may correspond to a product (e.g., a wafer), a set of manufacturing equipment, a type of substrate produced by manufacturing equipment, a combination thereof, or the like. Each instance of metrology data 169 and manufacturing data 150 may likewise correspond to a product, a set of manufacturing equipment, a type of substrate produced by manufacturing equipment, a combination thereof, or the like. The data store may further store information associating sets of different data types, e.g. information indicative that a set of sensor data, a set of metrology data, and/or a set of manufacturing data are all associated with the same product, manufacturing equipment, type of substrate, etc.

In some embodiments, the compressed sensing system 110 may generate compressed sensing data 166 using supervised machine learning (e.g., target output comprising virtual sensor data provided in compressed sensing system 110, etc.).

The client device 120, manufacturing equipment 124, sensors 126, metrology equipment 128, compressed sensing server 112, data store 140, server machine 170, and server machine 180 may be coupled to each other via a network 130 for generating compressed sensing data 166 and/or predictive data 168, optionally for performing corrective actions.

In some embodiments, network 130 is a public network that provides client device 120 with access to the compressed sensing server 112, data store 140, and/or other publically available computing devices. In some embodiments, network 130 is a private network that provides client device 120 access to manufacturing equipment 124, sensors 126, metrology equipment 128, data store 140, and/or other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 120 may include a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. The client device 120 may include a corrective action component 122. Corrective action component 122 may receive user input (e.g., via a Graphical User Interface (GUI) displayed via the client device 120) of an indication associated with manufacturing equipment 124. In some embodiments, the corrective action component 122 transmits the indication to the compressed sensing system 110, receives output (e.g., compressed sensing data 166) from the compressed sensing system 110, determines a corrective action based on the output, and causes the corrective action to be implemented.

In some embodiments, compressed sensing system 110 may further include a predictive component 116. Predictive component 116 may take data retrieved from compressed sensing component 114 to generate predictive data 168. In some embodiments, predictive component 116 provides predictive data 168 to client device 120, and client device 120 causes a corrective action via corrective action component 122 in view of predictive data 168. In some embodiments, the corrective action component 122 obtains sensor data 142 (e.g., current sensor data 146) associated with the manufacturing equipment 124 (e.g., from data store 140, etc.) and provides the sensor data 142 (e.g., current sensor data 146) associated with the manufacturing equipment 124 to the compressed sensing system 110.

In some embodiments, the corrective action component 122 stores sensor data 142 in the data store 140 and the compressed sensing server 112 retrieves the sensor data 142 from the data store 140. In some embodiments, the compressed sensing server 112 may store output (e.g., compressed sensing data 166) of the trained machine learning model(s) 190 in the data store 140 and the client device 120 may retrieve the output from the data store 140. In some embodiments, the corrective action component 122 receives an indication of a corrective action from the compressed sensing system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

In some embodiments, metrology data 192 corresponds to historical property data of products (e.g., produced using manufacturing parameters associated with historical sensor data 144 and historical manufacturing data 152) and the predictive data 168 is associated with predicted property data (e.g., of products to be produced or that have been produced in conditions recorded by current sensor data 146 and/or current manufacturing data 154). In some embodiments, the predictive data 168 is predicted metrology data (e.g., virtual metrology data) of the products to be produced or that have been produced according to conditions recorded as current sensor data 146 and/or current manufacturing data 154. In some embodiments, the predictive data 168 is or includes an indication of abnormalities (e.g., abnormal products, abnormal components, abnormal manufacturing equipment, abnormal energy usage, etc.) and/or one or more causes of the abnormalities. In some embodiments, the predictive data 168 includes an indication of change over time or drift in some component of manufacturing equipment 124, sensors 126, metrology equipment 128, and the like. In some embodiments, predictive data 168 includes an indication of an end of life of a component of manufacturing equipment 124, sensors 126, metrology equipment 128, or the like.

Performing manufacturing processes that result in defective products can be costly in time, energy, products, components, manufacturing equipment 124, the cost of identifying the defects and discarding the defective product, etc. By inputting sensor data 142 (e.g., manufacturing parameters that are being used to manufacture a product), receiving output of compressed sensing data 166, and performing a corrective action based on the compressed sensing data 166, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor data 142 (e.g., manufacturing parameters that are being used or are to be used to manufacture a product), receiving output of compressed sensing data 166, comparing compressed sensing data sets from the same chamber over time to diagnose drifting or failing components (recorded as predictive data 168), and performing corrective actions (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, and the like, may provide indications of degrading components.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting the sensor data 142 into the trained machine learning model 190, receiving an output of compressed sensing data 166, and performing (e.g., based on the compressed sensing data 166) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective action may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, feedback control, machine learning modification, or the like.

In some embodiments, the corrective action includes providing an alert (e.g., an alarm to stop or not perform the manufacturing process if the compressed sensing data 166 or predictive data 168 indicates a predicted abnormality, such as an abnormality of the product, a component, or manufacturing equipment 124). In some embodiments, the corrective action includes providing feedback control (e.g., modifying a manufacturing parameter responsive to the compressed sensing data 166 or predictive data 168 indicating an abnormality). In some embodiments, the corrective action includes providing machine learning (e.g., modifying one or more manufacturing parameters based on the predictive data 168). In some embodiments, performance of the corrective action includes causing updates to one or more manufacturing parameters.

Manufacturing parameters may include hardware parameters (e.g., replacing components, using certain components, replacing a processing chip, updating firmware, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., manufacturing equipment 124 to be in an idle mode, a sleep mode, a warm-up mode, etc.).

The compressed sensing server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The compressed sensing server 112 may include a compressed sensing component 114. In some embodiments, the compressed sensing component 114 may receive current sensor data 146, and/or current manufacturing data 154 (e.g., receive from the client device 120, retrieve from the data store 140) and generate output (e.g., compressed sensing data 166) for performing corrective action associated with the manufacturing equipment 124 based on the current data. In some embodiments, the compressed sensing component 114 may use one or more trained machine learning models 190 to determine the output for performing the corrective action based on current data.

Compressed sensing server 112 may also include predictive component 116. Predictive component 116 may be used to produce predictive data 168. In some embodiments, predictive data 168 includes indications of components of manufacturing equipment 124 aging, degrading, etc. In some embodiments, predictive component 116 may incorporate compressed sensing data 166 to determine predictions of wafer properties given the virtual measurements of conditions within the manufacturing chamber. In some embodiments, predictive component 116 includes a machine learning model.

In some embodiments, sensor data 142 is provided to trained machine learning model 190. Machine learning model 190 is trained to output data indicative of property values proximate to (e.g., at) the location of the substrate in the manufacturing chamber based on the input sensor data 142. Model 190 may utilize a sparse regression algorithm in some embodiments. In some embodiments, machine learning model 190 takes as input temperature data from a number of sensors disposed at locations within the manufacturing chamber. In some embodiments, at least a majority of the sensors are not at the location of the substrate. For example, temperature sensors may be disposed at various locations near gas intakes, exhaust conduits, substrate supports, chamber walls, and so on. Model 190 then produces as output, temperature data at all points within the chamber. In some embodiments, Model 190 may produce as output property values at areas of interest in the chamber (excluding property values at other areas that are not of interest), comprising at least locations proximate to the substrate. Producing data pertaining only to a subset of the locations within the chamber provides a technical advantage of utilizing fewer sensors 126 to reliably virtually measure property values on the substrate.

In some embodiments, model 190 produces as output a set of coefficients. These coefficients are used as weights to generate a weighted additive combination of members of a basis set. The weighted additive combination of the basis set is indicative of a map of property values in the manufacturing chamber. The basis set utilized by model 190 is generated by reduced order model generator 174 of server machine 170 in embodiments. The basis set may be saved as reduced order basis data 164 of data store 140. The basis set may be chosen in a way to represent maps of property values in the manufacturing chamber for different manufacturing input parameters using a small number of basis set members (e.g., a small number of coefficients output by model 190 are non-zero). The value of a parameter determining the number of non-zero coefficients output by model 190 may be determined during training of model 190.

In some embodiments, reduced order model generator 174 generates a basis set in view of the output of physics-based model 176. In some embodiments, physics-based model 176 is used to solve equations describing steady-state conditions in the manufacturing chamber at a variety of input parameters (power supplied to heaters, gas mix, gas flow, etc.). The chosen input parameters may span the region of parameter space considered relevant for the production of substrates. For each variation of input data, physics-based model 176 produces a map of property values corresponding to predicted property values, given the input data, at steady state in a manufacturing chamber. Data corresponding to the physics-based model may be stored as physics-based model data 160 in data store 140, including storing the produced maps of property values as model property map data 162. Reduced order model generator 174 takes as input a set of property value maps produced by physics-based model 176 (possibly retrieved from model property map data 162 of data store 140). Reduced order model generator 174 generates a basis set describing the group of property value maps. The generated basis set is stored as reduced order basis data 164 of data store 140. Reduced order model generator 174 may generate the basis set using a proper orthogonal decomposition algorithm.

Historical sensor data 144 may be used in combination with current sensor data 146 and manufacturing data 150 to detect drift, changes, aging, etc. of components of manufacturing equipment 124. Predictive component 116 may use combinations and comparisons of these data types to generate predictive data 168. In some embodiments, predictive data 168 includes data predicting the lifetime of components of manufacturing equipment 124, sensors 126, etc.

Combining sparse regression and physics-based modeling provides technical advantages over other techniques. An accurate physics-based model provides a reliable map of property values in a manufacturing chamber. However, due to ranges of manufacturing tolerances, aging components, etc., it is not always possible to perfectly model a manufacturing chamber. For instance, a heater may supply slightly less or more energy than expected, a gas flow regulator may not allow precisely the flow rate chosen, contact between surfaces in a chamber may be somewhat less than ideal, and the like. Such variations may be unknown to the user, and may not be captured in a purely physics-based model. By implementing a machine learning sparse regression model performing virtual measurement via compressed sensing, these limitations can be overcome. The machine learning model is trained on a variety of input parameters, spanning a region of parameter space. Variations in actual conditions in the chamber (due to inaccuracies in the model, as discussed above) within the range of parameter space the machine learning model is trained to operate on can be accounted for via interpolation, and settings somewhat outside the region of parameter space used to train the machine learning model can be accounted for via extrapolation. In this way, unexpected variations in a chamber's operating conditions can be incorporated into results from compressed sensing system 110.

In some embodiments, compressed sensing component 114 receives current sensor data 146, and may perform pre-processing such as extracting patterns in the data or combining data to new composite data. Compressed sensing component 114 may then provide the data to trained machine learning model 190 as input. Compressed sensing component 114 may receive from trained machine learning model 190 a map of property values, including values at the location of the substrate. Compressed sensing component 114 may then cause a corrective action to occur. The corrective action may include sending an alert to client device 120. The corrective action may also include updating manufacturing parameters of manufacturing equipment 124. The corrective action may also include generating predictive data 168, indicative of chamber or instrument drift, aging, or failure.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142, manufacturing data 150, physics-based model data 160, compressed sensing data 166, predictive data 168, and metrology data 169. Sensor data 142 may include historical sensor data 144 and current sensor data 146. Sensor data may include sensor data time traces over the duration of manufacturing processes, associations of data with physical sensors, pre-processed data, such as averages and composite data, and data indicative of sensor performance over time (i.e., many manufacturing processes). Manufacturing data 150 and metrology data 169 may contain similar features. Historical sensor data 144 and historical manufacturing data 152 may be historical data (e.g., at least a portion for training the machine learning model 190). The current sensor data 146 may be current data (e.g., at least a portion to be input into the trained machine learning model 190, subsequent to the historical data) for which compressed sensing data 166 is to be generated (e.g., for performing corrective actions). Metrology data 169 may be metrology data of produced substrates, as well as sensor data, manufacturing data, and model data corresponding to those products. Metrology data 169 may be leveraged to design processes for making further substrates. Predictive data 168 may include predictions of what metrology data may result from a set of input parameters. Predictive data 168 may also include data indicative of components of system 100 aging and failing over time.

In some embodiments, compressed sensing system 110 further includes server machine 170 and server machine 180. Server machine 170 includes a data set generator 172 that is capable of generating data sets (e.g., a set of data inputs and a set of target outputs) to train, validate, and/or test machine learning model 190. Some operations of data set generator 172 are described in detail below with respect to FIGS. 2 and 4A. In some embodiments, the data set generator 172 may partition the historical data (e.g., historical sensor data 144, historical manufacturing data 152) and physical model data (e.g., model property map data 162, reduced order basis data 164) into a training set (e.g., sixty percent of the data), a validating set (e.g., twenty percent of the data), and a testing set (e.g., twenty percent of the data). In some embodiments, the compressed sensing system 110 (e.g., via compressed sensing component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a machine learning model 190 using one or more sets of features associated with the training set from data set generator 172. The training engine 182 may generate multiple trained machine learning models 190, where each trained machine learning model 190 corresponds to a distinct set of features of the training set (e.g., sensor data from a distinct set of sensors). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features. Data set generator 172 may receive the output of a trained machine learning model (e.g., 190), collect that data into training, validation, and testing data sets, and use the data sets to train a second machine learning model.

The validation engine 184 may be capable of validating a trained machine learning model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained machine learning models 190 based on the corresponding sets of features of the validation set. The validation engine 184 may discard trained machine learning models 190 that have an accuracy that does not meet a threshold accuracy. In some embodiments, the selection engine 185 may be capable of selecting one or more trained machine learning models 190 that have an accuracy that meets a threshold accuracy. In some embodiments, the selection engine 185 may be capable of selecting the trained machine learning model 190 that has the highest accuracy of the trained machine learning models 190.

The testing engine 186 may be capable of testing a trained machine learning model 190 using a corresponding set of features of a testing set from data set generator 172. For example, a first trained machine learning model 190 that was trained using a first set of features of the training set may be tested using the first set of features of the testing set. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. In some embodiments, the machine learning model 190 utilizes a sparse regression algorithm to reconstruct property values on the substrate in a manufacturing chamber from a number of values provided by sensors disposed in the manufacturing chamber, at least a majority of which are not located at the location of the substrate. Machine learning model 190 may use LASSO regression to generate property values in the manufacturing chamber in some embodiments.

Compressed sensing component 114 may provide current sensor data 146 to the trained machine learning model 190 and may run the trained machine learning model 190 on the input to obtain one or more outputs. Compressed sensing component 114 may be capable of determining (e.g., extracting) compressed sensing data 166 from the output of the trained machine learning model 190 and may determine (e.g., extract) confidence data from the output that indicates a level of confidence that the compressed sensing data 166 is an accurate predictor of a process associated with the input data for products produced or to be produced using the manufacturing equipment 124 at the current sensor data 146. Predictive component 116 may be capable of determining predictive data 168, including predictions on finished substrate properties and predictions of effective lifetimes of components of manufacturing equipment 124, sensors 126, or metrology equipment 128 based on the output of model 190. Predictive component 116 be capable of determining confidence data that indicates a level of confidence that predictive data 168 is an accurate predictor of the specified events. Compressed sensing component 114, predictive component 116, or corrective action component 122 may use the confidence data to decide whether to cause a corrective action associated with the manufacturing equipment 124 based on compressed sensing data 166 and/or predictive data 168.

The confidence data may include or indicate a level of confidence. As an example, predictive data 168 may indicate the properties of a finished wafer given a set of manufacturing inputs. The confidence data may indicate that the predictive data 168 is an accurate prediction for products associated with at least a portion of the input data. In one example, the level of confidence is a real number between 0 and 1 inclusive, where 0 indicates no confidence that the predictive data 168 is an accurate prediction for products processed according to input data and 1 indicates absolute confidence that the predictive data 168 accurately predicts properties of products processed according to input data. Responsive to the confidence data indicating a level of confidence below a threshold level for a predetermined number of instances (e.g., percentage of instances, frequency of instances, total number of instances, etc.) the predictive component 116 may cause the trained machine learning model 190 to be re-trained (e.g., based on current sensor data 146, current manufacturing data 154, etc.).

For purpose of illustration, rather than limitation, aspects of the disclosure describe the training of one or more machine learning models 190 using historical data (e.g., historical sensor data 144, historical manufacturing data 152) and inputting current data (e.g., current sensor data 146, current manufacturing data 154) into the one or more trained machine learning models 190 to determine compressed sensing data 166. In other implementations, a heuristic model or rule-based model is used to determine compressed sensing data (e.g., without using a trained machine learning model, perhaps by specifying rather than training the value of a parameter controlling the sparsity of a fit). Compressed sensing component 114 and predictive component 116 may monitor historical sensor data 144, historical manufacturing data 152, and metrology data 169. Any of the information described with respect to data inputs 210 of FIG. 2 may be monitored or otherwise used in the heuristic or rule-based model.

In some embodiments, the functions of client device 120, compressed sensing server 112, server machine 170, and server machine 180 may be provided by a fewer number of machines. For example, in some embodiments server machines 170 and 180 may be integrated into a single machine, while in some other embodiments, server machine 170, server machine 180, and compressed sensing server 112 may be integrated into a single machine. In some embodiments, client device 120 and compressed sensing server 112 may be integrated into a single machine.

In general, functions described in one embodiment as being performed by client device 120, compressed sensing server 112, server machine 170, and server machine 180 can also be performed on compressed sensing server 112 in other embodiments, if appropriate. In addition, the functionality attributed to a particular component can be performed by different or multiple components operating together. For example, in some embodiments, the compressed sensing server 112 may determine the corrective action based on the predictive data 168. In another example, client device 120 may determine the predictive data 168 based on output from the trained machine learning model.

In addition, the functions of a particular component can be performed by different or multiple components operating together. One or more of the compressed sensing server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, or the like.

Although embodiments of the disclosure are discussed in terms of generating compressed sensing data 166 and predictive data 168 to perform a corrective action in manufacturing facilities (e.g., semiconductor manufacturing facilities), embodiments may also be generally applied to improved data processing by utilizing physics-informed virtual measurements and compressed sensing. Embodiments may be generally applied to characterizing and monitoring based on different types of data.

Figure 2:
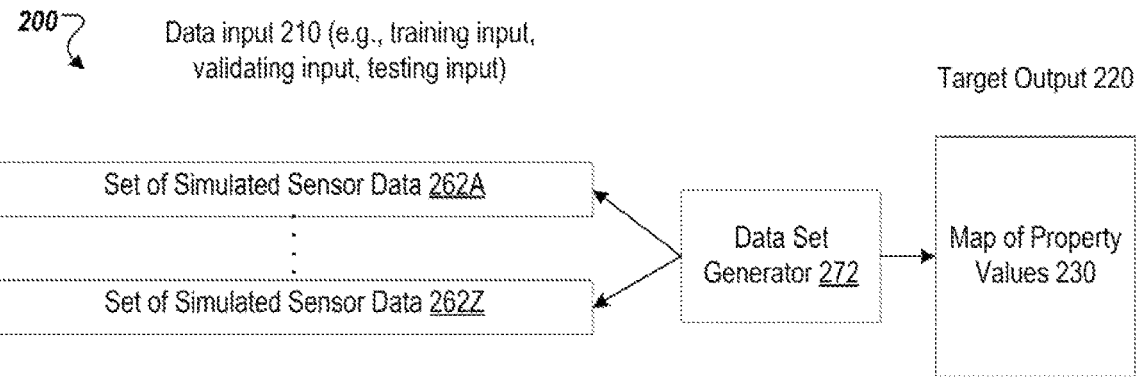
FIG. 2 is a block diagram of an example data set generator used to create data sets for a machine learning model, according to certain embodiments.

FIG. 2 is a block diagram of an example data set generator 272 (e.g., data set generator 172 of FIG. 1), used to create data sets for a machine learning model (e.g., model 190 of FIG. 1), according to certain embodiments. A data set generator 272 may be part of server machine 170 of FIG. 1. In some embodiments, system 100 of FIG. 1 includes multiple machine learning models. In such cases, each model may have a separate data set generator, or models may share a data set generator.

Referring to FIG. 2, system 200 containing data set generator 272 (e.g., data set generator 172 of FIG. 1) creates data sets for a machine learning model (e.g., model 190 of FIG. 1). Data set generator 272 may create data sets using data retrieved as output from a computer-aided physics-based model. In some embodiments, data set generator 272 creates training input by choosing a subset of points in a physics-based model (e.g., subset of points of model property map data 162 of FIG. 1, and an output from physics-based model 176 of FIG. 1). For example, the output of the physics-based model may be a map of temperatures at all locations within the chamber. Data set generator 272 may form a training set by extracting temperature values from a number of these locations. The locations used as training input correspond to the location of sensors in the manufacturing chamber (e.g., sensors 126 of FIG. 1). The placement of these sensors may have been selected by a user, or may have been output by a machine learning model trained to optimize placement of sensors in a manufacturing chamber for compressed sensing. In some embodiments, training input 210 is simulated data representing data that could be taken by physical sensors, including sets of simulated sensor data 262A-Z. Data set generator 272 also generates target output 220 for training a machine learning model. Target output includes a map of property values 230 in the manufacturing chamber, including property values located away from the locations of the sensors in the chamber. In some implementations, target output 220 comprises a map of properties in the chamber proximate to the location of the substrate. Map of property values 230 may include values throughout the chamber, values in areas of high interest, values only proximate to the substrate, etc. Input training data 210 and target output data 220 are supplied to a machine learning model (e.g., model 190 of FIG. 1).

It is within the scope of this disclosure for target output 220 to be represented in a variety of different ways. Map of property values 230 may be virtual measurements of property values away from the locations of virtual sensors, or it may be coefficients indicative of weights to be applied to members of a basis set in a reduced order model to generate virtual measurement values.

Referring to FIG. 2, in some embodiments, data set generator 272 generates a data set (e.g., training set, validating set, testing set) that includes one or more data inputs 210 (e.g., training input, validating input, testing input) and may include one or more target outputs 220 that correspond to the data inputs 210. The data set may also include mapping data that maps the data inputs 210 to the target outputs 220. Data inputs 210 may also be referred to as "features," "attributes," or "information." In some embodiments, data set generator 272 may provide the data set to the training engine 182, validating engine 184, or testing engine 186 of FIG. 1, where the data set is used to train, validate, or test machine learning model 190 of FIG. 1. Some embodiments of generating a training set may further be described with respect to FIG. 4A.

In some embodiments, data set generator 272 may generate a first data input corresponding to a first set of simulated sensor data 262A to train, validate, or test a first machine learning model and the data set generator 272 may generate a second data input corresponding to a second set of simulated sensor data 262B to train, validate, or test a second machine learning model.

In some embodiments, data set generator 272 may perform operations on one or more of data input 210 and target output 220. Data set generator 272 may extract patterns from the data (slope, curvature, etc.), may combine data (average, feature production, etc.), or may separate simulated sensors into groups to train separate models.

Data inputs 210 and target outputs 220 to train, validate, or test a machine learning model may include information for a particular manufacturing chamber (e.g., a particular semiconductor wafer manufacturing chamber). Data inputs 210 and target outputs 220 may include information for a particular manufacturing chamber design (e.g., used for all chambers of that design).

In some embodiments, the information used to train the machine learning model may be from specific types of manufacturing equipment (e.g., manufacturing equipment 124 of FIG. 1) of the manufacturing facility having specific characteristics and allow the trained machine learning model to determine outcomes for a specific group of manufacturing equipment 124 based on input for current sensor data (e.g., current sensor data 146) associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing a machine learning model using the data set, the machine learning model may be further trained, validated, or tested, or adjusted.

Figure 3:
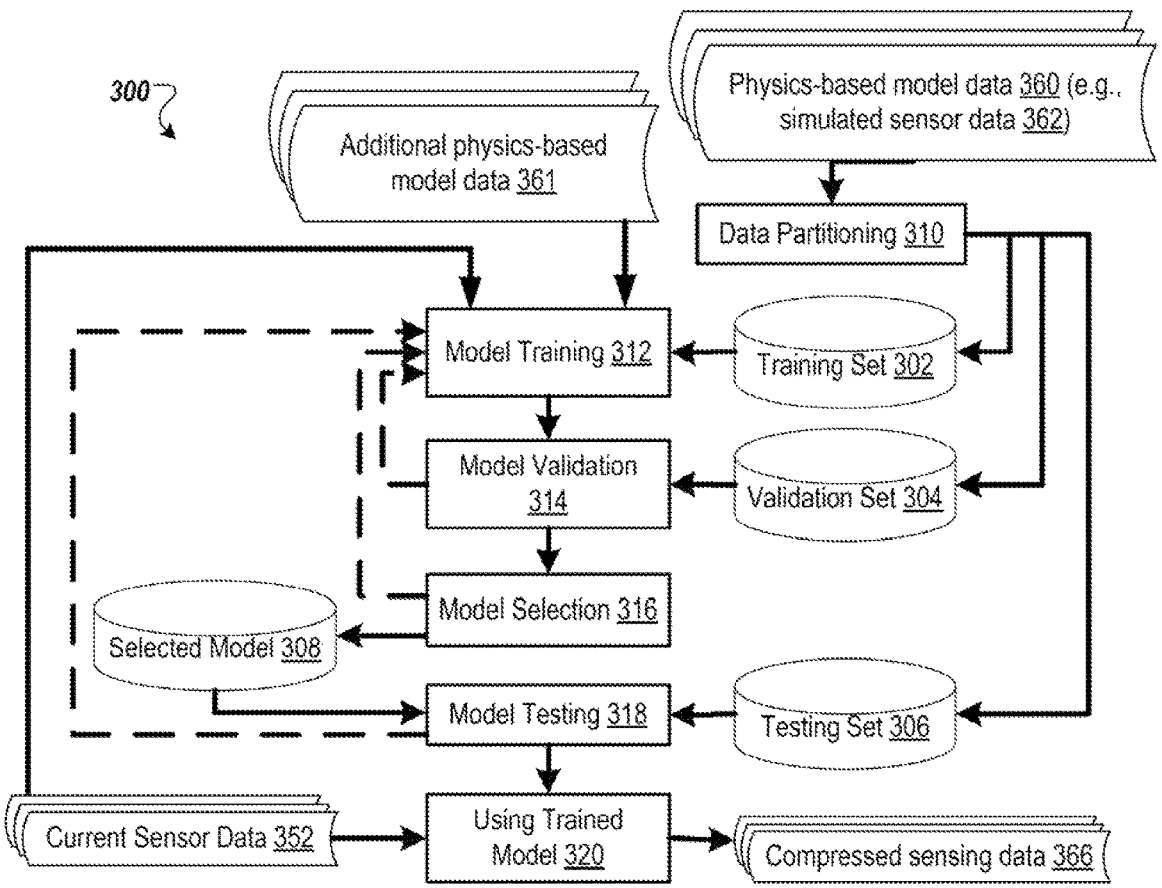
FIG. 3 is a block diagram illustrating system for generating output data (e.g., compressed sensing data), according to certain embodiments.

FIG. 3 is a block diagram illustrating system 300 for generating output data (e.g., compressed sensing data 166 of FIG. 1), according to certain embodiments. System 300 may be used to virtually measure the values of properties proximate to a substrate during a manufacturing process, using input from a number of sensors disposed away from the substrate and compressed sensing techniques.

Referring to FIG. 3, at block 310, the system 300 (e.g., components of compressed sensing system 110 of FIG. 1) performs data partitioning (e.g., via data set generator 172 of server machine 170 of FIG. 1) of computer-aided physics-based model data 360 (e.g., extracting simulated sensor data 362 from full model data sets) to generate the training set 302, validation set 304, and testing set 306. For example, the training set may be 60% of the simulated data, the validation set may be 20% of the simulated data, and the testing set may be 20% of the simulated data.

At block 312, the system 300A performs model training (e.g., via training engine 182 of FIG. 1) using the training set 302. The system 300 may train multiple models using multiple sets of features of the training set 302 (e.g., a first set of features including a group of simulated sensors of the training set 302, a second set of features including a different group of simulated sensors of the training set 302, etc.). For example, system 300 may train a machine learning model to generate a first trained machine learning model using the first set of features in the training set and to generate a second trained machine learning model using the second set of features in the training set (e.g., different data than the data used to train the first machine learning model). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., one model may be trained with simulated sensors 1-15, and a second model trained with simulated sensors 10-20). In some embodiments, hundreds of models may be generated including models with various permutations of features and combinations of models.

At block 314, the system 300 performs model validation (e.g., via validation engine 184 of FIG. 1) using the validation set 304. System 300 may validate each of the trained models using a corresponding set of features of the validation set 304. For instance, validation set 304 may use the same subset of simulated sensors used in training set 302, but for different input conditions. In some embodiments, the system 300A may validate hundreds of models (e.g., models with various permutations of features, combinations of models, etc.) generated at block 312. At block 314, the system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318 system 300 performs model testing (e.g., via testing engine 186 of FIG. 1) using the testing set 306 to test the selected model 308. The system 300 may test, using the first set of features in the testing set (e.g., simulated sensors 1-15), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 30A performs model training (e.g., retraining) using different training sets possibly corresponding to different sets of features or a reorganization of substrates split into training, validation, and testing sets. Responsive to determining that the selected model 308 has an accuracy that meets a threshold accuracy based on the testing set 306, flow continues to block 320. In at least block 312, the model may learn patterns in the simulated sensor data to make predictions and in block 318, the system 300 may apply the model on the remaining data (e.g., testing set 306) to test the predictions.

At block 320, system 300 uses the trained model (e.g., selected model 308) to receive current sensor data 346 (e.g., current sensor data 146 of FIG. 1) and determines (e.g., extracts), from the output of the trained model, compressed sensing data 366 (e.g., compressed sensing data 166 of FIG. 1) to perform an action (e.g., perform a corrective action in association with manufacturing equipment 124 of FIG., provide and alert to client device 120 of FIG. 1, etc.).

In some embodiments, retraining of the machine learning model occurs by supplying additional data to further train the model. Current sensor data 352 may be provided at block 312. Additional physics-based model data 361 may be provided as well. These data may be different from the data originally used to train the model by incorporating combinations of input parameters not part of the original training, input parameters outside the parameter space spanned by the original training, or may be updated to reflect chamber specific knowledge (e.g., differences from an ideal chamber due to manufacturing tolerance ranges, aging components, etc.). Selected model 308 may be retrained based on this data.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

Figure 4A:
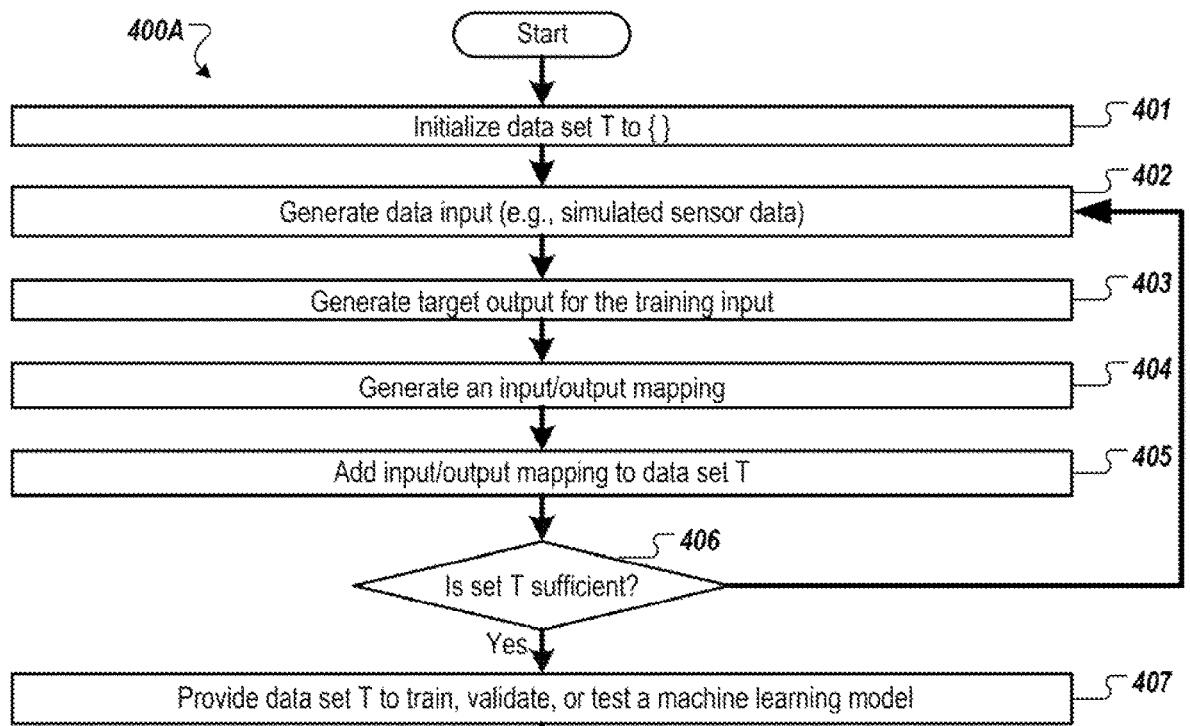
FIGS. 4A-C are flow diagrams of methods associated with compressed sensing predictive data to cause a corrective action, according to certain embodiments.
Figure 4B:
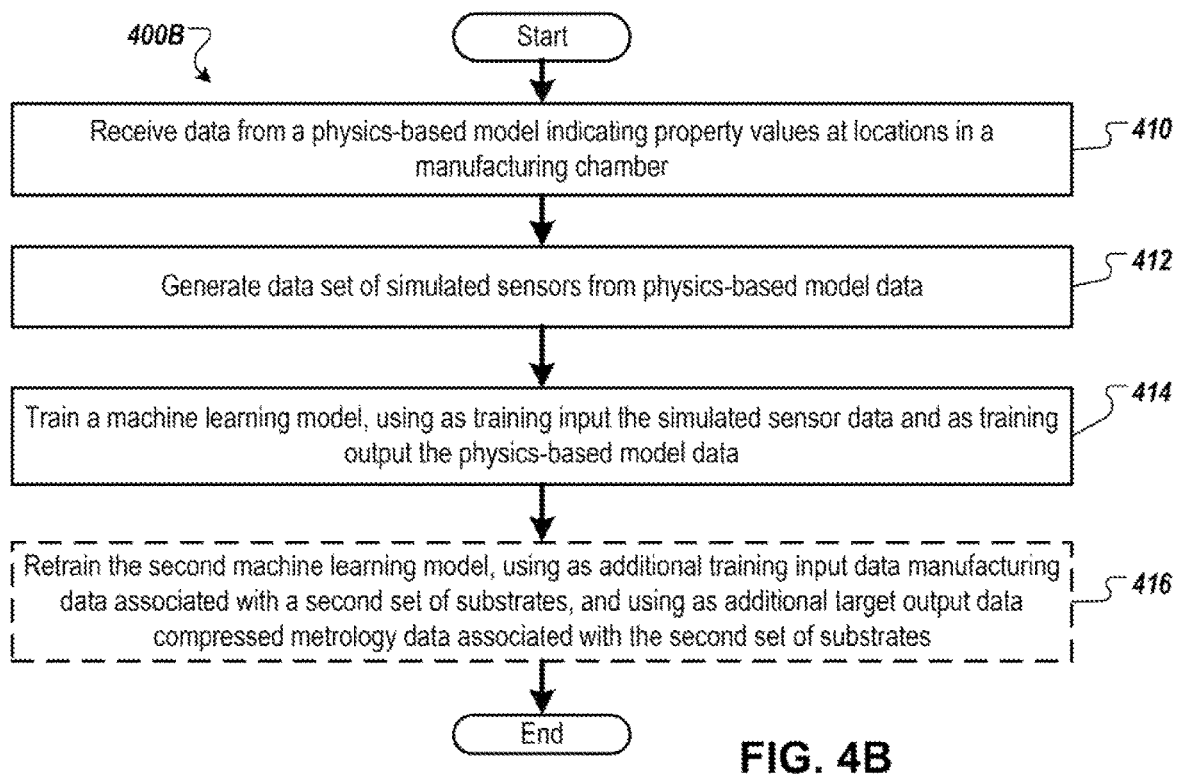
Figure 4C:
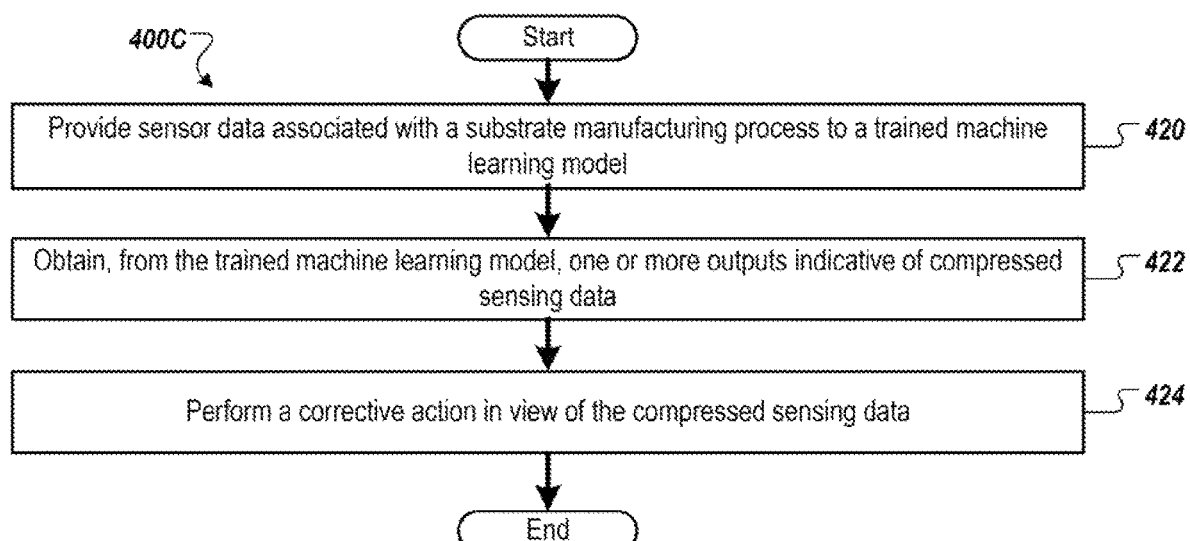

FIGS. 4A-C are flow diagrams of methods 400A-C associated with generating compressed sensing data to cause a corrective action, according to certain embodiments. Methods 400A-C may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-C may be performed, in part, by compressed sensing system 110. Method 400A may be performed, in part, by compressed sensing system 110 (e.g., server machine 170 and data set generator 172 of FIG. 1, data set generator 272 of FIG. 2). Compressed sensing system 110 may use method 400A to generate a data set to at least one of train, validate, or test a machine learning model, in accordance with embodiments of the disclosure. Method 400B may be performed by server machine 180 (e.g., training engine 182, etc.). Method 400C may be performed by compressed sensing server 112 (e.g., compressed sensing component 114). In some embodiments, a non-transitory storage medium stores instructions that when executed by a processing device (e.g., of compressed sensing system 110, of server machine 180, of compressed sensing server 112, etc.) cause the processing device to perform one or more of methods 400A-C.

For simplicity of explanation, methods 400A-C are depicted and described as a series of operations. However, operations in accordance with this disclosure can occur in various orders and/or concurrently and with other operations not presented and described herein. Furthermore, not all illustrated operations may be performed to implement methods 400A-C in accordance with the disclosed subject matter. In addition, those skilled in the art will understand and appreciate that methods 400A-C could alternatively be represented as a series of interrelated states via a state diagram or events.

FIG. 4A is a flow diagram of a method 400A for generating a data set for a machine learning model for generating compressed sensing data (e.g., compressed sensing data 166 of FIG. 1), according to certain embodiments.

Referring to FIG. 4A, in some embodiments, at block 401 the processing logic implementing method 400A initializes a training set T to an empty set.

At block 402, processing logic generates first data input (e.g., first training input, first validating input) that may include sensor data (e.g., simulated sensor data 262 of FIG. 2), etc. In some embodiments, the first data input may include a first set of features for types of data and a second data input may include a second set of features for types of data (e.g., as described with respect to FIG. 3).

At block 403, processing logic generates a first target output for one or more of the data inputs (e.g., first data input). In some embodiments, the first target output is property values received as the output of a physics-based model. In some embodiments, target output may be coefficients indicative of a weighted additive combination of basis set members in a reduced order model.

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output.

At block 405, processing logic adds the mapping data generated at block 404 to data set T, in some embodiments.

At block 406, processing logic branches based on whether data set T is sufficient for at least one of training, validating, and/or testing machine learning model 190 of FIG. 1. If so, execution proceeds to block 407, otherwise, execution continues back at block 402. It should be noted that in some embodiments, the sufficiency of data set T may be determined based simply on the number of inputs, mapped in some embodiments to outputs, in the data set, while in some other implementations, the sufficiency of data set T may be determined based on one or more other criteria (e.g., a measure of diversity of the data examples, accuracy, etc.) in addition to, or instead of, the number of inputs.

At block 407, processing logic provides data set T (e.g., to server machine 180 of FIG. 1) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of sparse regression machine learning models, input values of a given input/output mapping (e.g., numerical values associated with data inputs 210 of FIG. 2) are input to the sparse regression model, and output values (e.g., numerical values associated with target outputs 220 of FIG. 2) of the input/output mapping are stored as the target output. Additionally, a basis set representing a reduced order model is provided to the sparse regression model. The machine learning model learns to fit coefficients of the reduced order model to the input sensor data in a sparse manner, which is to say many of the coefficients are zero. This regression is performed by penalizing both inaccuracies of the fit and the number of non-zero coefficients.

By way of illustration, and not limitation, there follows a brief discussion of the mechanics of sparse regression. A sparse regression model is to recover a list of property values at various locations in the chamber, which may be expressed as a vector x. The basis set may be expressed as a matrix P, and the problem reduces to finding a vector a such that x=Pa. A vector expressing the known property values in the chamber, due to a sensor being disposed at those locations, called y, is contemplated. It can be said that y=Cx, where C is a sparse matrix of ones and zeros, expressing which data points of the chamber property values x are known. The problem can then be expressed as CPa=y, which is an over-determined system (there are more sensors, y, than non-zero basis set member coefficients, a). Sparse regression is a method of finding a solution for such a system.

Over many training sets, the machine learning model chooses an appropriate value of a parameter controlling the number of non-zero coefficients in the reduced order model. After block 407, machine learning model (e.g., machine learning model 190) can be at least one of trained using training engine 182 of server machine 180, validated using validating engine 184 of server machine 180, or tested using testing engine 186 of server machine 180. The trained machine learning model may be implemented by compressed sensing component 114 (of compressed sensing server 112) to generate compressed sensing data 166 for performing signal processing or for performing corrective action associated with the manufacturing equipment 124.

FIG. 4B is a method 400B for training a machine learning model (e.g., model 190 of FIG. 1) for determining compressed sensing data to cause performance of a corrective action.

Referring to FIG. 4B, at block 410 of method 400B, the processing logic receives data from a physics-based model. The data indicates the value of properties in the manufacturing chamber at steady state, for a particular arrangement of input settings (processing parameters, hardware settings, etc.). The physics-based model data may be expressed as coefficients of a basis set in a reduced order model. The model data may be retrieved by the processing logic from memory (e.g., data store 140 of FIG. 1), rather than directly from the physics-based model. In some cases, more than one machine learning model may be parts of a single compound machine learning model. In this case, training one component of this compound model may involve receiving output from another component of the model as training input to the component of the model to be trained.

At block 412, the processing logic generates a data set of simulated sensors. This data may be a subset of data points from the physics-based model data received at block 410. The specific data points used as simulated sensors may be determined by determining which data points correspond to locations in a manufacturing chamber where sensors can be placed. This data is mapped to the physics-based model data set that it is a subset of.

At block 414, the processing logic provides the sets of simulated sensor data to the machine learning model as training input. Processing logic provides the physics-based model data to the machine learning model as target output. The machine learning model is then trained to provide virtual sensing of property values in the manufacturing chamber by performing sparse regression on sensor data to construct a map of property values in the chamber, in particular property values proximate to the substrate.

At block 416, the machine learning model may be retrained, using additional data from a physics-based model. In one embodiment, the machine learning model's training is continually updated to account for or predict drift in the manufacturing equipment, sensors, metrology equipment, etc., to predict failure of equipment, to reflect changes to procedures or recipes, etc. The processing logic provides, as additional training input data, additional data from a physics-based model, different than the first. The processing logic provides, as target output data, simulated sensor data taken from the physics-based model data.

FIG. 4C is a method 400C for using a trained machine learning model (e.g., model 190 of FIG. 1) for determining compressed sensing data.

Referring to FIG. 4C, at block 420 of method 400C, the processing logic provides current sensor data associated with a substrate manufacturing process to a trained machine learning model. The sensor data type may correspond to that provided in block 412 of FIG. 400B to train the machine learning model.

At block 422, the processing logic obtains, from the trained machine learning model, one or more outputs indicative of compressed sensing data. In some embodiments, the compressed sensing data may be temperature data, including data representing locations proximate to the substrate in a manufacturing chamber.

At block 424, the processing logic causes performance of a corrective action. In some embodiments, the corrective action may be taken in view of the output of the machine learning model after the output data has been further processed, for instance after the coefficients of a reduced order model have been applied as weights to an additive combination of basis set members to recover property values in the chamber. The types of corrective actions that are consistent with this disclosure can vary broadly. In some embodiments, the performance of the corrective action may include one or more of: providing an alert to a user; interrupting functionality of the manufacturing equipment; updating manufacturing parameters, including process parameters and hardware parameters; planning replacement of a component of the manufacturing equipment; causing one or more components to be in a sleep mode or an idle mode at particular times during manufacturing of the products to reduce energy usage; replacement of one or more components to reduce energy usage; causing preventative maintenance; causing a modification of the components (e.g., tightening mounting screws, replacing binding, etc.); correcting for sensor drift of sensors associated with the manufacturing equipment; correcting for chamber drift; updating a process recipe, or the like. The predictive data and/or corrective action may be indicative of a combination (e.g., combination of components, combination of manufacturing parameters) that is causing abnormalities (e.g., where just one of the items from the combination may not cause the abnormality by its own).

Figure 5:
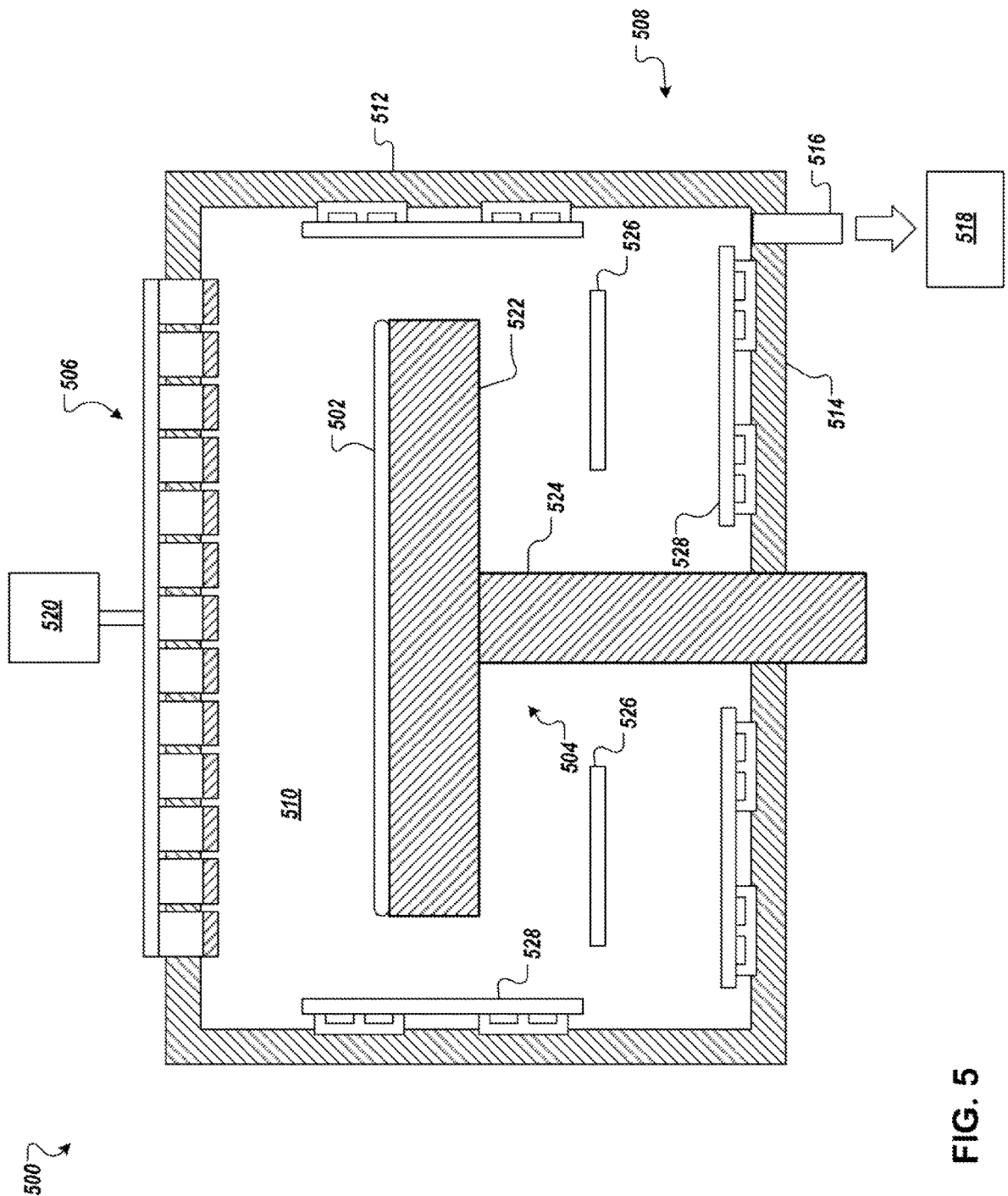
FIG. 5 depicts a sectional view of a manufacturing chamber (e.g., a semiconductor wafer manufacturing chamber) according to some embodiments.

FIG. 5 depicts a sectional view of a manufacturing chamber 500 (e.g., a semiconductor wafer manufacturing chamber) according to some aspects of this disclosure. Manufacturing chamber 500 may be one or more of an etch chamber, deposition chamber (including atomic layer deposition, chemical vapor deposition, physical vapor deposition, or plasma enhanced versions thereof), anneal chamber, or the like. For example, manufacturing chamber 500 may be a chamber for a plasma etcher, a plasma cleaner, and so forth. Examples of chamber components may include a substrate support assembly 504, an electrostatic chuck, a ring (e.g., a process kit ring), a chamber wall, a base, a showerhead 506, a gas distribution plate, a liner, a liner kit, a shield, a plasma screen, a flow equalizer, a cooling base, a chamber viewport, a chamber lid, a nozzle and so on.

In one embodiment, manufacturing chamber 500 includes a chamber body 508 and a showerhead 506 that enclose an interior volume 510. In some chambers, showerhead 506 may be replaced by a lid and a nozzle. Chamber body 508 may be constructed from aluminum, stainless steel, or other suitable material. Chamber body 508 generally includes sidewalls 512 and a bottom 514.

An exhaust port 516 may be defined in chamber body 508, and may couple interior volume 510 to a pump system 518. Pump system 518 may include one or more pumps and valves utilized to evacuate and regulate the pressure of interior volume 510 of manufacturing chamber 500.

Showerhead 506 may be supported on sidewalls 512 of chamber body 508 or on a top portion of the chamber body. Showerhead 506 (or the lid, in some embodiments) may be opened to allow access to interior volume 510 of manufacturing chamber 500, and may provide a seal for manufacturing chamber 500 while closed. Gas panel 520 may be coupled to manufacturing chamber 500 to provide process or cleaning gases to interior volume 510 through showerhead 506 (or lid and nozzle). Showerhead 506 may include multiple gas delivery holes throughout. Examples of processing gases that may be used to process substrates in manufacturing chamber 500 include halogen-containing gases, such as $C_2F_6$, $SF_6$, $SiCl_4$, HBr, $NF_3$, $CF_4$, $CHF_3$, $F_2$, $Cl_2$, $CCl_4$, $BCl_3$, and $SiF_4$, among others, and other gases such as $O_2$ or $N_2O$. Examples of carrier gases include $N_2$, He, Ar, and other gases inert to process gases (e.g., non-reactive gases).

Substrate support assembly 504 is disposed in interior volume 510 of manufacturing chamber 500 below showerhead 506. In some embodiments, substrate support assembly 504 includes susceptor 522 and shaft 524. Substrate support assembly 504 supports a substrate during processing. In some embodiments, also disposed within manufacturing chamber 500 are one or more heaters 526 and reflectors 528.

Understanding the values of properties in the manufacturing chamber proximate to the substrate is useful in controlling processing outcomes. In many situations, it is impractical to monitor conditions at the location of the substrate. In other situations, it is possible to monitor conditions at some portions of the substrate, but not across the entire area. Methods and systems of this disclosure provide ways to infer the value of properties at the location of the substrate, without sensors being disposed at that location.

In some embodiments, virtual measurement of property values proximate to the substrate are obtained by performing compressed sensing (e.g., using compressed sensing system 110 of FIG. 1). When placing sensors to monitor conditions in manufacturing chamber 500 proximate to substrate 502 is inconvenient, there may be many other areas in the manufacturing chamber where sensors can be more easily disposed. Such locations may include susceptor 522, shaft 524, reflectors 528, exhaust port 516, chamber body 508, etc.

With the aid of a computer-aided physics-based model (e.g., physics-based model 176 of FIG. 1), measurement of property values in these accessible locations allows virtual measurement of conditions at the location of the substrate. To utilize the physics-based model, a set of input parameters, such as heater power, gas composition, gas flow, chamber pressure, hardware parameters, etc., are defined. These different input conditions define a region of parameter space, understood to be the entire landscape of possible input parameters to the manufacturing process. The set of input parameters may be chosen to be tightly grouped in parameter space around conditions useful for a particular process, a particular wafer, may be chosen to span substantially the entire region of parameter space considered likely to be useful in substrate processing, or using another metric.

A representation of the manufacturing chamber, along with processing parameters representing one possible set of conditions, are received by the physics-based model. The model then uses computational techniques to solve equations describing fluid flow, thermodynamics, heat transfer, and the like to recover a map of property values in the manufacturing chamber. The map may be a representation of steady-state property values. This process is repeated for selected combinations of processing parameters. The group of property value maps resulting from this procedure span a region of property value space within the manufacturing chamber associated with the region of parameter space defined by the chosen input parameters.

In some embodiments, the information output by the physics-based model can be expressed in a more convenient way for virtual measurement. A basis set is generated, consisting of members that, when combined in a weighted additive manner, can recreate substantially any portion of property value space spanned by the property value maps output by the physics-based model. This basis set is generated as a reduced order model (e.g., by reduced order model generator 174 of FIG. 1). The reduced order model is constructed such that a fairly small number of basis set members can reconstruct the majority of physics in the chamber, which is to say reconstruct property values at points in the chamber which are substantially equal to those output by the physics-based model. The basis set may be constructed using a proper orthogonal decomposition algorithm. The specific range meant by "substantially equal" may vary based on application, but may be related to experimental error, measurement error, acceptable manufacturing tolerance, or the like.

In some embodiments, a selection of the points output by the physics-based model are of interest. For instance, limiting virtual measurements to boundaries between components of manufacturing chamber 500 (e.g., ignoring property values interior to components) allows useful predictions of property values to be made with fewer sensors than are used to virtually measure property values at all points in the chamber. Areas of interest may be locations where the change in a property value is above a certain threshold in outputs from the physics-based model with different processing parameter inputs.

Once data is retrieved from the physics-based model, sensors are disposed within the chamber. The possible locations where sensors can be disposed may be limited by geometry, engineering concerns, and the like. Information can be extracted from locations where property values vary as input values to the physics-based model or input parameters to manufacturing processes change. Information can be extracted if the property values at the locations sensors are disposed are not correlated. Accounting for these and any other constraints, locations for sensors are chosen. In some embodiments, a machine learning tool may be used to optimize sensor locations.

Without being bound by theory, the number of sensors used to recreate the map of property values in the manufacturing chamber can be estimated as $n_s \sim k \times \log N/k$, where $n_s$ is the number of sensors, k is the number of members of a basis set used to reconstruct the map of property values, and N is related to the number of locations in the chamber where the property values are predicted. The regions of the chamber to be mapped and the number of basis set members used are tuned, in some implementations, to allow compressed sensing using a feasible or convenient number of sensors.

During a manufacturing process, conditions in manufacturing chamber 500 are monitored by sensors. Data indicative of measurements made by the sensors are provided as input to a trained machine learning model (e.g., model 190 of FIG. 1). The trained machine learning model is trained to reconstruct values of properties in areas of the chamber not measured by the sensors (e.g., the location of the substrate). The trained machine learning model utilizes a sparse regression algorithm to determine weights of a number of members of the basis set generated by reduced order model generator 174. In this way, conditions proximate to the substrate can be virtually measured without disposing sensors at the location of the substrate. Physics-informed virtual measurement and compressed sensing offers advantages over other techniques. Chamber-to-chamber differences, due to part variation, drift, manufacturing tolerance ranges, and the like, are accounted for by using sensor data projected into property value space. Additionally, conditions outside the space spanned by the output of the physics-based model can also be understood using these methods.

In some embodiments, compressed sensing data is then used to make a corrective action. The corrective action may include sending an alert to a client device. The corrective action may include adjusting a processing recipe by making an adjustment to at least one processing parameter. The corrective action may be facilitated by supplying compressed sensing data to another model. The second model may be used to monitor component health or drift, chamber aging, and the like. The second model may take corrective actions (e.g., recommending maintenance, recommending component replacement, etc.) in view of compressed sensing data.

Figure 6:
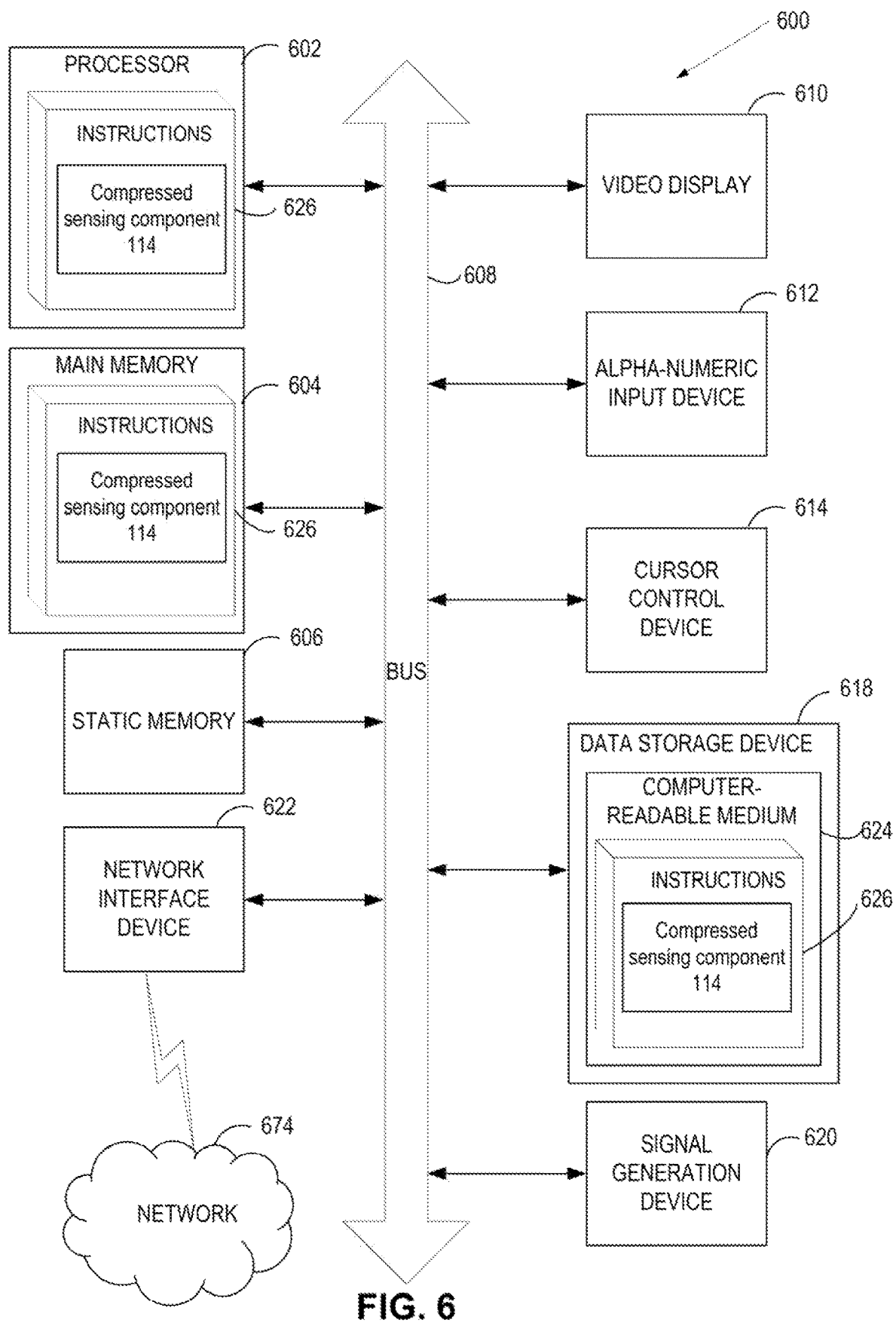
FIG. 6 is a block diagram illustrating a computer system, according to certain embodiments.

FIG. 6 is a block diagram illustrating a computer system 600, according to certain embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some implementations, data storage device 618 may include a non-transitory computer-readable storage medium 624 (e.g., non-transitory machine-readable storage medium) on which may store instructions 626 encoding any one or more of the methods or functions described herein, including instructions encoding components of FIG. 1 (e.g., compressed sensing component 114, model 190, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   measuring a subset of property values in a manufacturing chamber using a plurality of sensors disposed within the manufacturing chamber during a process performed on a substrate in the manufacturing chamber;
   determining a map of property values proximate to the substrate in the manufacturing chamber based on inputting measurements of the subset of property values in the manufacturing chamber into a trained machine learning model, wherein the trained machine learning model is configured to represent property values in the manufacturing chamber in accordance with a reduced order model, wherein the map of property values is determined as a weighted additive combination of a number of members of the reduced order model that are a subset of a basis set that describes property values of interest in the manufacturing chamber; and
   performing an action in response to the map of property values indicating an abnormality, the action comprising making an adjustment to at least one processing parameter associated with operation of the manufacturing chamber or sending an alert to a client device.

2. The method of claim 1, wherein the trained machine learning model comprises a sparse regression model, wherein the map of property values is determined using a sparse regression algorithm of the sparse regression model.

3. The method of claim 1, the basis set having been determined in view of results of a physics-based computer-aided model predicting property values throughout the manufacturing chamber for a plurality of different processing parameter configurations.

4. The method of claim 1, wherein the map of property values comprises temperatures at a plurality of locations on the substrate.

5. The method of claim 4, wherein the measuring the subset of property values in the manufacturing chamber comprises taking temperature measurements at a plurality of points, at least a majority of which are not on the substrate, in the manufacturing chamber.

6. A method comprising:
   generating training data for a machine learning model, wherein generating the training data comprises:
       identifying a first training input comprising data indicative of first property values associated with a limited subset of property values in a manufacturing chamber; and
       identifying a first target output for the first training input, wherein the first target output comprises a map of property values in a plurality of locations within the manufacturing chamber, wherein a number of the plurality of locations is more than a number of locations of the subset of property values used as the first training input; and
   providing the training data to train the machine learning model on (i) a set of training inputs comprising the first training input, and (ii) a set of target outputs comprising the first target output, wherein the trained machine learning model is to execute on a computing device, and is to receive a new input comprising data indicative of second property values associated with a limited subset of property values in the manufacturing chamber, the second property values being different than the first property values, and to produce a new output based on the new input, the new output comprising a map of property values proximate to a substrate in the manufacturing chamber determined as a weighted additive combination of a number of members of a reduced order model that are a subset of a basis set, and wherein the computing device is to perform at least one of (i) adjusting manufacturing parameters associated with operation of the manufacturing chamber or (ii) sending an alert to a user device, in response to the new output indicating an abnormality.

7. The method of claim 6, wherein each training input in the set of training inputs is mapped to the target output in the set of target outputs.

8. The method of claim 6, wherein the training inputs comprise data indicative of a number of measurements taken of property values in the manufacturing chamber at locations not adjacent to the substrate, and the target outputs comprise predictions of property values at locations proximate the substrate.

9. The method of claim 6, wherein the target outputs comprise data indicative of results of a computer-aided physics-based model, describing property values in the manufacturing chamber for a plurality of processing parameters.

10. The method of claim 9, wherein a subset of the results of the computer-aided physics-based model, corresponding to locations in the manufacturing chamber where change in the value of a property of interest is above a certain threshold when steady-state conditions with different manufacturing parameters are compared, is used.

11. The method of claim 6, wherein the machine learning model comprises a sparse regression model.

12. The method of claim 6, wherein the subset of property values comprises measurements of conditions at a limited number of locations in the manufacturing chamber.

13. The method of claim 12, wherein the limited number of locations are chosen by inputting results of a computer-aided physics-based model into a second trained machine learning model, an output of the second trained machine learning model comprising optimized locations to take measurements.

14. A non-transitory machine-readable storage medium storing instructions that, when executed by a processing device, cause the processing device to perform operations comprising:

receiving data indicative of measurements of a subset of property values within a manufacturing chamber containing a substrate;

determining, using a trained machine learning model, a map of property values within the manufacturing chamber, comprising property values proximate to the substrate, wherein the trained machine learning model is configured to represent property values of interest in the manufacturing chamber in accordance with a reduced order model, wherein the map of property values is determined as a weighted additive combination of a number of members of the reduced order model that are a subset of a basis set that describes the property values of interest in the manufacturing chamber; and performing at least one of (i) adjusting manufacturing parameters associated with operation of the manufacturing chamber in view of the map of property values, or (ii) sending an alert to a user device in response to the map of property values indicating an abnormality.

15. The non-transitory machine-readable storage medium of claim 14, wherein the basis set is constructed in view of results of a computer-aided physics-based model of the manufacturing chamber evaluated at a plurality of processing parameters.

16. The non-transitory machine-readable storage medium of claim 14, the measurements of the subset of property values in the manufacturing chamber comprising temperature measurements taken at a plurality of points within the manufacturing chamber, at least a majority of which are not on the substrate.

17. The non-transitory machine-readable storage medium of claim 14, the map of property values comprising temperatures at a plurality of points in the manufacturing chamber, the plurality of points comprising at least points on the substrate.

* * * * *